United States Patent [19]

Bredland et al.

[11] 4,059,717
[45] Nov. 22, 1977

[54] BATTERY HAVING MASK WHICH ELECTROCHEMICALLY INACTIVATES LIMITED SURFACE OF METALLIC COMPONENT

[75] Inventors: Alf Marlov Bredland, Middleton; Walter Lee Fong, Madison; Terry Glen Messing, Verona; John Walter Paulson, Madison, all of Wis.

[73] Assignee: ESB Incorporated, Philadelphia, Pa.

[21] Appl. No.: 735,827

[22] Filed: Oct. 26, 1976

[51] Int. Cl.$^2$ .................................... H01M 2/32
[52] U.S. Cl. .................................. 429/162; 429/178
[58] Field of Search ............ 429/162, 178, 157, 185

[56] References Cited

U.S. PATENT DOCUMENTS

| | | | |
|---|---|---|---|
| 1,295,122 | 2/1919 | Chamberlain | 429/82 |
| 2,231,319 | 2/1941 | Burgess | 429/48 |
| 2,279,575 | 4/1942 | Lawson | 429/166 |
| 2,343,194 | 2/1944 | Lawson | 429/198 |
| 2,496,709 | 2/1950 | Gelardin | 429/162 |
| 2,870,235 | 1/1959 | Soltis | 429/82 |
| 3,081,371 | 3/1963 | Toda et al. | 429/162 |
| 3,115,429 | 12/1963 | Reilly et al. | 429/178 |
| 3,708,340 | 1/1973 | Tamminen | 429/162 |

*Primary Examiner*—Donald L. Walton
*Attorney, Agent, or Firm*—Raymond L. Balfour

[57] ABSTRACT

A battery has a metallic component the inner surface of which is in contact with the battery electrolyte and the outer surface of which is not in contact with the electrolyte. To prevent undesired corrosion a mask is placed over a portion of the inner surface in order to electrochemically inactivate the portion of the inner surface covered by it. Although the metallic component having the mask may be the positive electrode or a terminal, preferably it is the negative electrode and preferably the negative electrode is a metallic foil such as zinc, lead, magnesium, or aluminum or alloys thereof. The outer surface of the metallic component opposite the mask may be exposed to the air. An electrical lead may be connected to the outer surface of the metallic component opposite the mask. Where the mask is applied to the inner surface of an electrode, the mask may contain metal or a metalic compound of a chemical composition compatible with the electrode in order to compensate for the loss in electrochemical activity at the surface of the electrode covered by the mask.

32 Claims, 5 Drawing Figures

BATTERY HAVING MASK WHICH ELECTROCHEMICALLY INACTIVATES LIMITED SURFACE OF METALLIC COMPONENT

BACKGROUND OF THE INVENTION

Metallic components of dry cell batteries sometimes have inner surfaces which are in contact with the electrolyte and outer surfaces which are not. These metallic components may be an electrode—particularly the negative electrode or anode, but also sometimes the positive electrode or cathode—and/or a terminal for the battery.

During the electrochemical reactions associated with intentional charging and discharging of the battery, the inner surfaces of these metallic electrodes are corroded at a rate which is intended to be uniform across the surface of the metal. In addition and in contrast with this, however, these electrodes sometimes undergo an undesired and localized corrosion, the consequences of which may be reduced capacity, shorter shelf life, and a leakage of electrolyte to the outside of the battery. While this undesired local corrosion may occur randomly at any location on the surface of the electrode, experience has shown that it is particularly likely to occur at areas where electrical contact is made to the outer surface of the electrode or where the outer surface of the electrode is exposed to the air.

In an effort to reduce or eliminate the undesired corrosion that appears to occur randomly, a variety of corrosion inhibitors have been applied to the electrochemically active surface of a battery's zinc electrode in order to reduce the rate at which that surface reacts, particularly during the shelf life of the battery. For example, in U.S. Pat. No. 2,231,319 an adhesive film is shown being used between superimposed layers of thin zinc, with the adhesive being dissolved, disintegrated, decomposed or otherwise affected by the electrolyte; as a result the local couples which develop in dry cells because of process forming operations and the use of hot solder are avoided. Wood balsams and a $CrO_3$ radical are shown in U.S. Pat. Nos. 2,279,575 and 2,343,194, respectively, as being applied onto the inner exposed surface of the zinc electrode, thereby inhibiting the corrosion which occurs during periods of battery inactivity and thereby improving the shelf life and intermittent drain properties of the battery. In all of these illustrations the corrosion inhibitor is applied over the entire electrochemically active surface of the zinc electrode, and an improvement in the shelf life of the battery is undoubtedly obtained only at the cost of some reduction in the discharge rate during intentional discharge of the battery.

As mentioned above, areas of the metallic component where electrical connections are made have been observed to be places where the undesired, localized corrosions frequently occur. While the corrosion problem may occur with connections relying upon pressure or adhesives to maintain good contact, the problem is particularly great when connections are made using heat. The heat alters the grain structure of the metal in the vicinity of the electrical connection, thereby sensitizing that portion of the metallic component to the undersired corrosion. This problem can be accelerated or aggravated by solder connections, due not only to the heat associated with soldering but also the dissimilarity of the solder metal (e.g., lead and tin) to the metallic component of the battery to which the connection is made (e.g., zinc). The corrosion problem becomes increasingly severe as the thickness of the metallic component is reduced, causing the potential corrosion and its consequences to be one of the principal limiting factors on the possible thinness of the metallic component and the battery. Increasing the thickness of the metal to combat the possible corrosion problem results in increased battery thickness and/or reduced capacity, increased costs, and reduced electrochemical efficiency where the metallic component is an electrode of the battery (e.g., a zinc anode).

Another consideration of importance in the design and manufacture of batteries is the ability to make an electrical connection to the exterior of the battery after the battery assembly process has been completed. The prior art shows electrical connections being soldered to the electrochemically active surface of a zinc anode, with the soldered connection then being coated with a deposit of electrically insulating adhesive which would prevent the solder from electrochemically "poisoning" the battery; see U.S. Pat. No. 2,870,235. In that construction, however, the solder connection and the adhesive application are made before the zinc electrode is assembled into the battery, and the problems of soldering to the exterior of a live, assembled battery are not addressed or resolved. Also as shown in U.S. Pat. No. 2,870,235, both the solder connection and the adhesive coating appear on a surface of the zinc electrode which is in contact with the battery electrolyte.

In some battery designs the metallic component may have an exterior surface which is totally or partially exposed to the air, even though no electrical connection is made to that surface as a final step in the assembly of an otherwise completed battery. Such a surface may be left intentionally exposed so that electrical contact may be made with an appliance long after the battery has been assembled, and the ability of the battery to withstand undesired corrosion during the shelf like period is highly important. Such surfaces represent areas where undesired corrosion is likely to occur and where steps to prevent it are especially needed.

There is, therefore, a need for a means to prevent localized corrosion which simultaneously meets several requirements: reduces or eliminates the undesired corrosion in those local areas where it is most likely to occur, without reducing the electrochemical activity of the remainder of the metallic surface; permits use of thin metallic components, such as thin foils that are commercially available; permits use of electrical connections, particularly heat connections, while combating the possible effects of grain restructuring and of poisoning caused by dissimilar metals; permits electrical connections to be made with heat to the exterior of previously assembled batteries; and protects where an area of the metal is to be exposed to the air for long periods of time.

SUMMARY OF THE INVENTION

The invention provides a means of preventing undesired localized corrosion of a metallic battery component, either an electrode or a terminal, which component has its inner surface in contact with the electrolyte and its outer surface not in contact with the electrolyte. The invention provides a mask over a portion of the inner surface of the metallic component.

Where the metallic component is an electrode, the mask prevents localized corrosion without reducing the rate of electrochemical activity on the remainder of the electrode surface. The discharge rate of the battery is therefore not reduced by the corrosion preventing means. To compensate for the loss of electrochemical activity at the surface of the electrode, the mask may contain metal or a metallic compound of a chemical composition compatible with the electrode.

The invention permits the use of very thin metallic foils as battery components, since extra metal thickness is not required as a means of insuring against undesired corrosion.

By placing the mask on the inner surface of an electrode or terminal opposite where an electrical connection is to be made, the mask prevents the metal from becoming electrochemically sensitized due to the heat and/or dissimilar materials used in making and maintaining the electrical connection. The mask permits electrical connections to be made to the exterior of an assembled battery, rather than to a component which is later assembled into and is on the interior of a battery.

The mask also prevents corrosion in constructions where an area of the outer surface of the metallic component is exposed to the air, and thus permits easy electrical connections after long periods of battery inactivity on the shelf.

Preferably the metallic component is the negative electrode of the battery and preferably the electrode is a metallic foil such as zinc, lead, magnesium, or aluminum or alloys thereof.

Figure 1:
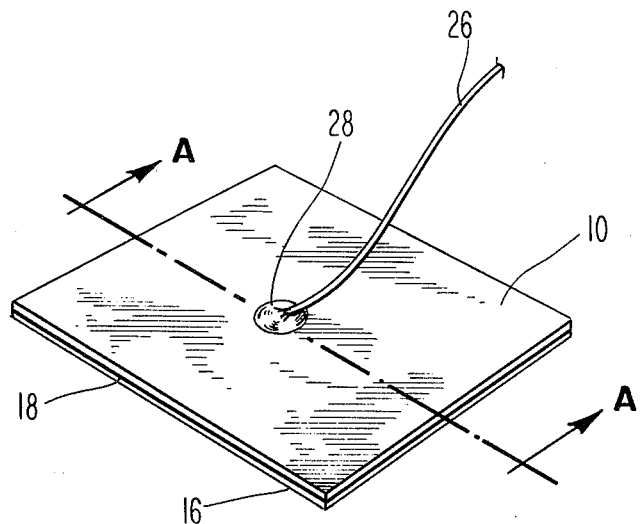
FIG. 1 is a pictorial view of a battery containing the mask of this invention.

Thicknesses of the materials have been exaggerated in the drawings for purposes of illustration.

DESCRIPTION OF THE PREFERRED EMBODIMENTS

FIG. 1 shows a dry cell battery containing the mask of this invention, which mask is not visible in FIG. 1.

Figure 2:
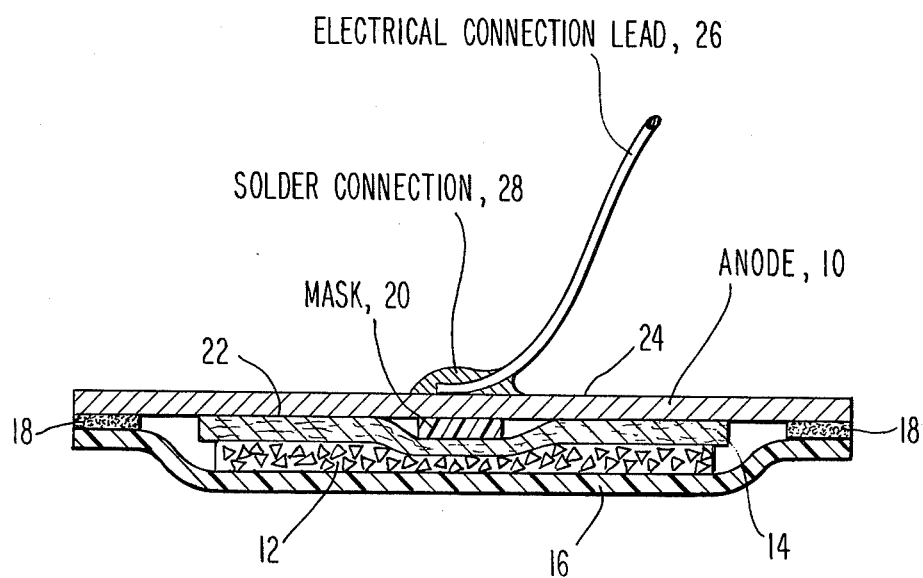
FIG. 2 is a cross-section taken along the line A—A of FIG. 1.

Referring to FIG. 2 where the battery of FIG. 1 is shown in cross-section, the battery comprises a negative electrode or anode 10 made from a thin foil of zinc or other metal, a positive electrode or cathode 12, and an electrolyte-containing layer 14 between the anode and cathode. A layer of electrically conductive plastic 16, situated on the side of the cathode 12 opposite the anode 10, is sealed to and electrically insulated from the battey at the perimeter of the battey by an insulating adhesive 18. The outer surface of the anode, which is exposed to the air, functions as the negative terminal of the battery.

FIG. 2 also shows a mask 20 covering a portion of the electrochemically active surface 22 of the anode 10 (i.e., that surface of the anode which faces the cathode 12 and electrolyte-containing layer 14). The mask 20 electrochemically inactivates the surface of the anode covered by it. On the outer surface 24 of the anode opposite the mask 20 is an electrical connection lead 26 attached to the anode 10 by a solder connection 28. The mask 20, applied to the anode 10 before the anode is assembled together with the cathode 12, electrolyte-containing layer 14, plastic 16, and adhesive 18, permits the electrical connection lead 26 to be soldered to the thin foil of metal in the assembled battery without causing unwanted corrosion of the metal in the area of the mask and solder connection. The mask 20 shown in FIG. 2 may be made from a plastic film (e.g., polypropylene) bonded to the anode 10 with an electrolyte-proof adhesive such as polyamide hot melt adhesive; another embodiment may be a pressure-sensitive tape of appropriate plastic film and adhesive.

Figure 3:
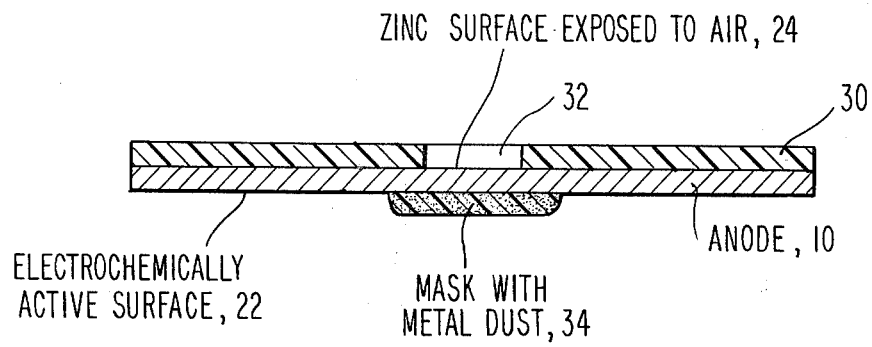
FIGS. 3, 4, and 5 are cross-sections showing alternative constructions of the mask and other features.

Alternative construction features associated with the anode and mask are shown in FIG. 3. On the exterior surface of the anode, which is not intended to be electrochemically active, there is an electrically nonconductive plastic layer 30 which provides electrical insulation for the anode as well as additional protection for the prevention of corrosion. A hole 32 is provided in the plastic 30 to permit electrical contact to be made with the exterior of the anode, which hole also exposes the outer surface 24 of the anode to the ambient air. To prevent unwanted corrosion in the area of the hole 32, a mask 34 is situated on the position of the electrochemically active surface 22 opposite the hole 32. The mask 34 is made from an electrically conductive hot melt adhesive and, to compensate for the loss in electrochemically active surface area of the anode covered by the mask, the hot melt adhesive is loaded with dust of a metal or metallic compound which is compatible with the anode; besides providing additional electrochemically active material, the dust provides a surface around the boundary between the mask 34 and the anode 10 which is electrochemically similar to the anode itself, and thus reduces the tendency for corrosion around that boundary (electrochemical dissimilarities between adjacent battery components enchance corrosion, sometimes where such corrosion is not wanted).

Figure 4:
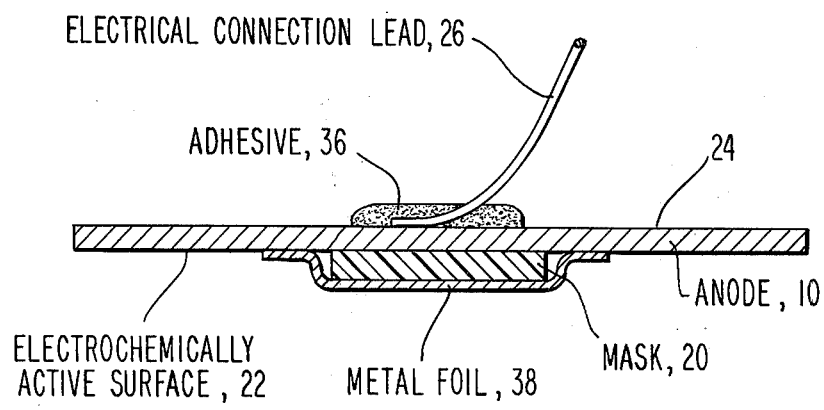

FIg. 4 illustrates still other alternative construction features associated with the anode and mask. The electrical connection lead 26 is shown joined to the exterior surface 24 of the anode 10 by a pressure-sensitive adhesive 36, which can be used without the heat which increases the corrosion hazard to the metal anode. On the electrochemically active surface 22 of the anode 10, the mask 20 is being covered with a separate metal foil 38 similar to the anode 10; like the dust included in the mask 34 shown in FIG. 3, the foil 38 shown in FIG. 4 provides additional electrochemically active surface area to increase the capacity of the battery and decreases the electrochemical dissimilarity at the boundary between the mask and the anode.

Figure 5:
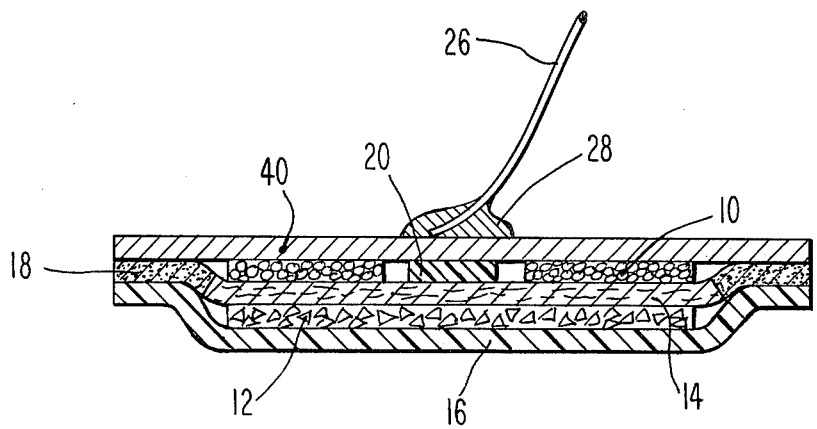

FIG. 5 shows a modification of the battery appearing in FIGS. 1 and 2. As shown in FIG. 5, the negative terminal 40 of the battery is a metal foil such as steel, zinc, or lead the inner surface of which is in contact with the internal components of the battery and the outer surface of which is exposed to the air. In contact with the inner surface of the negative terminal 40 is the negative electrode or anode 10, comprising particles of metal active material held together by a binder matrix or deposited in a flame spray, vacuum deposition, or or other process. Within an opening in the anode 10 there is a mask 20, similar to the one shown in FIG. 2, which is applied onto the inner surface of the negative terminal 40. Progressing downward in the construction shown in FIG. 5, the battery contains a cathode 12 and an electrolyte-containing layer 14 between the anode and cathode. A layer of electrically conductive plastic 16, situated on the side of the cathode 12 opposite the anode 10, is sealed with and electrically insulated from the negative terminal 40 at the perimeter of the battery by an insulating adhesive 18 which is impregnated into an extension of the electrolyte-containing layer 14. On the outer surface of the negative terminal 40 is the electrical connection lead 26 attached to the terminal 40 by a solder connection 28. In the construction shown in FIG. 5 the inner surface of negative terminal 40 is in contact with the electrolyte that is diffused through anode 10, cathode 12, and layer 14, and the mask 20 will protect the terminal 40 from undesired corrosion in the area covered by the mask. Although not shown in FIG. 5, the particles of anode material 10 may extend over the mask 20 so that there is no discontinuity or opening in the anode.

The metallic component to which the mask is applied may be selected from a wide variety of metals, with the particular metal for a particular battery design being selected on the basis of the electrochemical system of the battery and whether the metal component is to function as an electrode or terminal or both. When used as an electrode, the metallic component may be: zinc in the electrochemical systems using that material for the anode; lead in the lead-acid system; magnesium in combination with manganese dioxide, cuprous chloride, silver chloride or other cathodes; and aluminum in conbination with manganese dioxide. When used as a terminal the inside surface of which is not intended to be the anode of the battery, the metallic component may be selected from a wide variety of metals which produce no unwanted electrochemical reactions.

While the present invention requires a battery having a metallic component the inside surface of which is in contact with the electrolyte and is partically covered by a mask, the invention is not otherwise limited in its broadest sense. It is not limited to specific configurations, and can be used with both flat and cylindrical cell designs. Specific features shown in FIGS. 2 through 5 are included for illustrative purposes only and not as essential features of the invention in its broadest sense.

We claim:

1. An improvement in a flat battery having a metallic foil component the inner surface of which is in contact with the battery electrolyte and the outer surface of which is not in contact with the electrolyte, the improvement providing means for preventing undesired corrosion of the metallic component, the improvement comprising a mask over a portion of the inner surface which electrochemically inactivates the portion of the inner surface covered by it.

2. The battery of claim 1 in which the metallic component is an electrode.

3. The battery of claim 2 in which the metallic component is the negative electrode.

4. The battery of claim 3 in which the negative electrode is selected from the group consisting of zinc, lead, magnesium, aluminum and alloys thereof.

5. The battery of claim 2 in which the metallic component is the positive electrode.

6. The battery of claim 1 in which the metallic component is a terminal of the battery.

7. The battery of claim 3 in which the negative electrode is also the terminal of the battery.

8. The battery of claim 1 in which the outer surface of the metallic component opposite the mask is exposed to the air.

9. The battery of claim 2 in which the outer surface of the metallic component opposite the mask is exposed to the air.

10. The battery of claim 3 in which the outer surface of the metallic component opposite the mask is exposed to the air.

11. The battery of claim 4 in which the outer surface of the metallic component opposite the mask is exposed to the air.

12. The battery of claim 5 in which the outer surface of the metallic component opposite the mask is exposed to the air.

13. The battery of claim 6 in which the outer surface of the metallic component opposite the mask is exposed to the air.

14. the battery of claim 7 in which the outer surface of the metallic component opposite the mask is exposed to the air.

15. The battery of claim 1 in which there is an electrical connection to the outer surface of the metallic component opposite the mask.

16. The battery of claim 2 in which there is an electrical connection to the outer surface of the metallic component opposite the mask.

17. The battery of claim 3 in which there is an electrical connection to the outer surface of the metallic component opposite the mask.

18. The battery of claim 4 in which there is an electrical connection to the outer surface of the metallic component opposite the mask.

19. The battery of claim 5 in which there is an electrical connection to the outer surface of the metallic component opposite the mask.

20. The battery of claim 6 in which there is an electrical connection to the outer surface of the metallic component opposite the mask.

21. The battery of claim 7 in which there is an electrical connection to the outer surface of the metallic component opposite the mask.

22. The battery of claim 8 in which there is an electrical connection to the outer surface of the metallic component which is opposite the mask and exposed to the air.

23. The battery of claim 9 in which there is an electrical connection to the outer surface of the metallic component which is opposite the mask and exposed to the air.

24. The battery of claim 10 in which there is an electrical connection to the outer surface of the metallic component which is opposite the mask and exposed to the air.

25. The battery of claim 11 in which there is an electrical connection to the outer surface of the metallic component which is opposite the mask and exposed to the air.

26. The battery of claim 12 in which there is an electrical connection to the outer surface of the metallic component which is opposite the mask and exposed to the air.

27. The battery of claim 13 in which there is an electrical connection to the outer surface of the metallic component which is opposite the mask and exposed to the air.

28. The battery of claim 14 in which there is an electrical connection to the outer surface of the metallic component which is opposite the mask and exposed to the air.

29. The battery of claim 2 in which the mask contains metal of a chemical composition compatible with the metallic component covered by the mask.

30. The battery of claim 3 in which the mask contains metal of a chemical composition compatible with the metallic component covered by the mask.

31. The battery of claim 4 in which the mask contains metal of a chemical composition compatible with the metallic component covered by the mask.

32. The battery of claim 5 in which the mask contains metal of a chemical composition compatible with the metallic component covered by the mask.

* * * * *